United States Patent
Quemy

(10) Patent No.: US 11,226,889 B2
(45) Date of Patent: Jan. 18, 2022

(54) REGRESSION PREDICTION IN SOFTWARE DEVELOPMENT

(71) Applicant: International Business Machines Corporation, Armonk, NY (US)

(72) Inventor: Alexandre Quemy, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/866,717

(22) Filed: May 5, 2020

(65) Prior Publication Data

US 2021/0349811 A1   Nov. 11, 2021

(51) Int. Cl.
  *G06F 11/36* (2006.01)
  *G06Q 30/04* (2012.01)
  *G06N 20/00* (2019.01)

(52) U.S. Cl.
  CPC ........ *G06F 11/3684* (2013.01); *G06F 11/368* (2013.01); *G06F 11/3664* (2013.01); *G06N 20/00* (2019.01); *G06Q 30/04* (2013.01)

(58) Field of Classification Search
  CPC ............. G06F 11/3684; G06F 11/3664; G06F 11/368; G06Q 30/04; G06N 20/00
  USPC ................................................ 717/124–167
  See application file for complete search history.

(56) References Cited

U.S. PATENT DOCUMENTS

| | | | |
|---|---|---|---|
| 8,473,897 B2 * | 6/2013 | Box | G06F 8/437 717/106 |
| 8,527,813 B2 | 9/2013 | Budnik et al. | |
| 9,239,710 B2 * | 1/2016 | Araya | G06F 8/42 |
| 10,261,870 B2 | 4/2019 | Cmielowski et al. | |
| 2006/0168565 A1 * | 7/2006 | Gamma | G06F 11/3688 717/122 |
| 2009/0271324 A1 * | 10/2009 | Jandhyala | G06F 11/3438 705/80 |

(Continued)

FOREIGN PATENT DOCUMENTS

| | | |
|---|---|---|
| CN | 105045719 A | 11/2015 |
| CN | 106294156 B | 12/2018 |

OTHER PUBLICATIONS

Chen, Yih-Farn, David S. Rosenblum, and Kiem-Phong Vo. "Test-Tube: A system for selective regression testing." Proceedings of 16th International Conference on Software Engineering. IEEE, 1994.pp. 211-220 (Year: 1994).*

(Continued)

*Primary Examiner* — Satish Rampuria
(74) *Attorney, Agent, or Firm* — Stosch Sabo

(57) ABSTRACT

Described are techniques for predictive regression testing. The techniques include a method comprising constructing a call graph of a modified codebase including at least one modified node corresponding to a modified function. The method further comprises generating a subset of codebase tests by removing respective codebase tests that do not call for the at least one modified node. The method further comprises generating respective partial Abstract Syntax Trees (AST) sequences for relevant test paths in the call graph that connect the at least one modified node to one of the subset of codebase tests. The method further comprises inputting, to a machine learning model, the respective partial AST sequences, and generating, based on output from the machine learning model, predicted regression testing results for the relevant test paths.

20 Claims, 11 Drawing Sheets

(56) References Cited

U.S. PATENT DOCUMENTS

| | | | | |
|---|---|---|---|---|
| 2012/0254665 A1* | 10/2012 | Pasala | ........... | G06F 11/3684 714/33 |
| 2016/0062753 A1* | 3/2016 | Champagne | ........... | G06F 8/51 717/137 |
| 2020/0272559 A1* | 8/2020 | Ahluwalia | ........... | G06F 11/3684 |

OTHER PUBLICATIONS

Rothermel, Gregg, and Mary Jean Harrold. "A safe, efficient regression test selection technique." ACM Transactions on Software Engineering and Methodology (TOSEM) 6.2 (1997): pp. 173-210. (Year: 1997).*

Rothermel, Gregg, and Mary Jean Harrold. "Analyzing regression test selection techniques." IEEE Transactions on software engineering 22.8 (1996): pp. 529-551. (Year: 1996).*

Rosenblum, David S., and Elaine J. Weyuker. "Predicting the cost-effectiveness of regression testing strategies." Proceedings of the 4th ACM SIGSOFT symposium on Foundations of software engineering. 1996.pp. 118-126 (Year: 1996).*

Rothermel, Gregg, et al. "Prioritizing test cases for regression testing." IEEE Transactions on software engineering 27.10 (2001): pp. 929-948. (Year: 2001).*

Malishevsky, Alexey G., Gregg Rothermel, and Sebastian Elbaum. "Modeling the cost-benefits tradeoffs for regression testing techniques." International Conference on Software Maintenance, 2002. Proceedings.. IEEE, 2002.pp. 204-213 (Year: 2002).*

Musco et al., "A Large-scale Study of Call Graph-based Impact Prediction using Mutation Testing", Software Quality Journal, Springer Verlag, 2017, 25 (3), Submitted on Jul. 18, 2016, 28 pages <https://hal.inria.fr/hal-01346046/document>.

Musco, V., "Analyse de la propagation basée sur les graphes logiciels et les données synthétiques", Nov. 2016, 141 pages, <https://tel.archives-ouvertes.fr/tel-01398903/document>.

Anonymous, "Method to reduce the risk of regression associated to a set of changes in software code based on repository items suggestions", An IP.com Prior Art Database Technical Disclosure, IP.com No. IPCOM000259196D, IP.com Electronic Publication Date: Jul. 19, 2019, 4 pages.

Machalica et al., "Predictive Test Selection", May 29, 2019, 10 pages.

Anonymous, "Choose the possible fail tests cases based on execution history and change set", An IP.com Prior Art Database Technical Disclosure, IP.com No. IPCOM000241082D, IP.com Electronic Publication Date: Mar. 26, 2015, 5 pages.

Anderson et al., "Striving for Failure: An Industrial Case Study About Test Failure Prediction", 2015 IEEE/ACM 37th IEEE International Conference on Software Engineering, May 16-24, 2015, pp. 49-58.

Chaikalis et al., "Forecasting Java Software Evolution Trends Employing Network Models", IEEE Transactions on Software Engineering, vol. 41, No. 6, Jun. 2015, pp. 582-602.

Mell et al., "The NIST Definition of Cloud Computing", Recommendations of the National Institute of Standards and Technology, Sep. 2011, 7 pages.

\* cited by examiner

REGRESSION PREDICTION IN SOFTWARE DEVELOPMENT

BACKGROUND

The present disclosure relates to regression testing, and, more specifically, to predictive regression testing.

Regression testing includes running functional and/or non-functional tests to ensure that updated software still runs appropriately. A test failure on a new version of software as a result of updates to the software can be referred to as a regression. Regression testing can be performed during initial software development and/or during software maintenance such as software updates (e.g., bug fixes, configuration changes, software improvements, etc.).

SUMMARY

Aspects of the present disclosure are directed toward a computer-implemented method comprising constructing a call graph of a modified codebase including at least one modified node corresponding to a modified function. The method further comprises generating a subset of codebase tests by removing respective codebase tests that do not call for the at least one modified node. The method further comprises generating respective partial Abstract Syntax Trees (AST) sequences for relevant test paths in the call graph that connect the at least one modified node to one of the subset of codebase tests. The method further comprises inputting, to a machine learning model, the respective partial AST sequences. The method further comprises generating, based on output from the machine learning model, predicted regression testing results for the relevant test paths.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
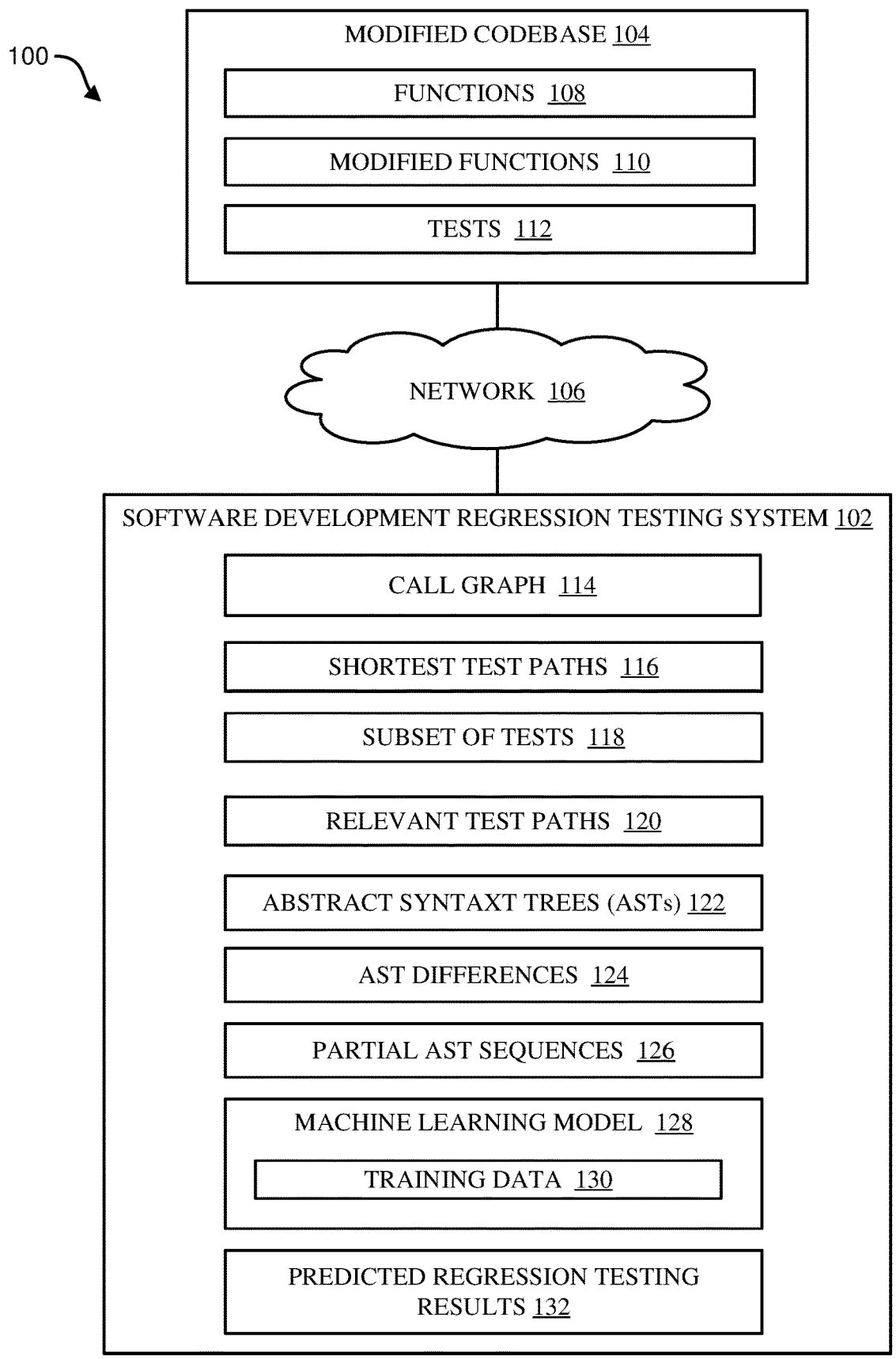
FIG. 1 illustrates a block diagram of an example computational environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward regression testing, and, more specifically, to predictive regression testing. While not limited to such applications, embodiments of the present disclosure may be better understood in light of the aforementioned context.

Regression testing can be performed when codebases are modified. Some regression testing (e.g., lower-granularity testing) can be performed on-the-fly during software development, whereas other regression testing (e.g., higher-level testing) can be scheduled in advance and performed over longer periods of time (e.g., overnight, etc.) with dedicated computing resources. Thus, some regression testing, and particularly higher-level regression testing, can be time-consuming and resource intensive to implement.

Aspects of the present disclosure are directed toward predictive regression testing, where the predictive regression testing can generate predicted test failures using a trained machine learning model for modified codebases without executing source code from the codebases. Furthermore, in some embodiments, the trained machine learning model can be trained on a first programming language and subsequently applicable to accurately generating predicted regression testing results for codebases in other programming languages.

Collectively, aspects of the present disclosure realize an improved regression testing tool for software development, where the improved regression testing tool realizes benefits such as, but not limited to, improved efficiency, improved transferability, and improved accuracy. Efficiency can be improved at least insofar as generating predicted regression testing results occurs faster and uses fewer resources that executing source code to determine actual regression testing results. Transferability can be improved by utilizing ASTs with s-expression notation for training data and input data to the machine learning model, where ASTs with s-expression notation are programming language independent and thus readily transferable amongst codebases in different programming languages. Accuracy can be improved at least insofar as the partial AST sequences used as training data and as input data concisely capture the cascaded effects of modified functions in a modified codebase.

Turning now to the figures, FIG. 1 illustrates a block diagram of an example computational environment 100 including a software development regression testing system 102 communicatively coupled to a modified codebase 104 by a network 106. In some embodiments, the software development regression testing system 102 can be a stand-alone software package executed on a physical computer (or a virtually provisioned computer). In such embodiments, the software development regression testing system 102 can be downloaded to the physical computer from a remote data processing system. Alternatively, the software development regression testing system 102 can reside on a remote data processing system and be accessible to the computer by a network portal. In yet other embodiments, the software development regression testing system 102 can be incorporated into a software development tool such as, for example an Integrated Development Environment (IDE) tool.

Modified codebase 104 can refer to a codebase for a corresponding software application. The modified codebase 104 can include functions 108, modified functions 110, and tests 112. Functions 108 can refer to distinct executable portions of software code in the modified codebase 104. Modified functions 110 can refer to portions of the software code that are modified relative to a previously validated version of the modified codebase 104. Thus, functions 108 can represent a previous version of the modified codebase 104 and modified functions 110 can represent changes made to the modified codebase 104 since the time of the previous version. Tests 112 can refer to software validation tests for validating that various functionalities of the modified codebase 104 execute as intended.

Software development regression testing system 102 can include a call graph 114 based on the modified codebase 104. The call graph 114 can be any call multigraph, control flow graph, or other graph indicative of calling routines between subroutines in the modified codebase 104. Respective nodes in the call graph 114 can represent respective functions (or procedures), and respective edges in the call graph 114 can indicate calling relationships between the respective functions.

The software development regression testing system 102 can further include a set of shortest test paths 116 between the modified functions 110 and the tests 112. The set of shortest test paths 116 are the shortest test paths between the modified functions 110 and the tests 112 (rather than all of the test paths) because the set of shortest test paths 116 are used to determine which of tests 112 utilize any of the modified functions 110. Accordingly, aspects of the present disclosure only need to know whether there is any test path connecting each test 112 to any modified function 110. In certain embodiments, using the set of shortest test paths 116 can improve efficiency be limiting the number of test paths that need to be determined.

The software development regression testing system 102 can further include a subset of tests 118 that are taken from tests 112 and which utilize at least one modified function 110. The subset of tests 118 can be derived using the shortest test paths 116. For example, for any test 112 that is associated with one of the shortest test paths 116 (and thus, associated with at least one modified function 110), that test 112 is included in the subset of tests 118. Conversely, for any test 112 that is not associated with any shortest test paths 116 (and thus, not associated with any of the modified functions 110), that test 112 is excluded from the subset of tests 118.

The software development regression testing system 102 can further include relevant test paths 120. Here, every test path associated with the subset of tests 118 is included (rather than only the shortest test paths 116). As will be appreciated by one skilled in the art, the relevant test paths 120 represent all of the test paths that must be re-tested for regression as each of the relevant test paths 120 include at least one of the modified functions 110. Accordingly, the relevant test paths 120 will at least include all of the shortest test paths 116 and possibly include additional test paths.

The software development regression testing system 102 can further include Abstract Syntax Trees (ASTs) 122 of the functions 108 and the modified functions 110. ASTs 122 can be an abstract syntactic structure of source code written in a given programming language. As is understood by on skilled in the art, ASTs 122 do not necessarily represent every aspect of the source code on which they are based. Instead, ASTs 122 include structural and/or content-related aspects of the source code. In some embodiments, ASTs 122 are represented using s-expression notation. S-expression notation (short for "symbolic expression" and also referred to as sexpr or sexp) is a technique for efficiently representing a nested list of data. Advantageously, ASTs with s-expression notation are programming language independent, thus making ASTs with s-expression notation transferrable between codebases containing source code in different programming languages.

The software development regression testing system 102 can further include AST differences 124 which is an AST representation of the modified functions 110 with differences indicated relative to a previously validated version of the corresponding functions 108. As with the ASTs 122, in some embodiments, the AST differences 124 are represented using s-expression notation.

The software development and regression testing system 102 can further include partial AST sequences 126, where the partial AST sequences 126 can represent, for an AST difference 124, the cascaded effect of the AST difference 124 through a given test path of the relevant test paths 120. Said another way, each partial AST sequence 126 can track the cascaded effect of a modified function 110 (using the corresponding AST difference 124) to one or more other nodes in a test path to the relevant test paths 120, where the one or more other nodes directly or indirectly call the modified function 110.

The software development and regression testing system 102 can further include machine learning model 128. The machine learning model 128 can be configured to predict outcomes for each of the relevant test paths 120. The machine learning model 128 can include training data 130.

In some embodiments, the machine learning model 128 can include any number of machine learning algorithms such as, but not limited to, natural language processing (NLP), decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning model 128 can be configured to perform machine learning on the training data 130 using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

After training the machine learning model 128 on the training data 130, the machine learning model 128 can ingest partial AST sequences 126 and output predicted regression testing results 132. Advantageously, the predicted regression testing results 132 can be predicted with a high degree of accuracy without executing the modified codebase 104. Executing the machine learning model 128 on the partial AST sequences 126 can require fewer computational resources than executing the tests 112 on the modified codebase 104. Furthermore, although training the machine learning model 128 using the training data 130 can be resource intensive, the trained machine learning model 128 is subsequently transferrable between different applications and even between applications written in different programming languages. The machine learning model 128 is transferrable because ASTs and ASTs with s-expression can be representative of the structures of numerous programming languages without being limited to any particular programming language.

Figure 2:
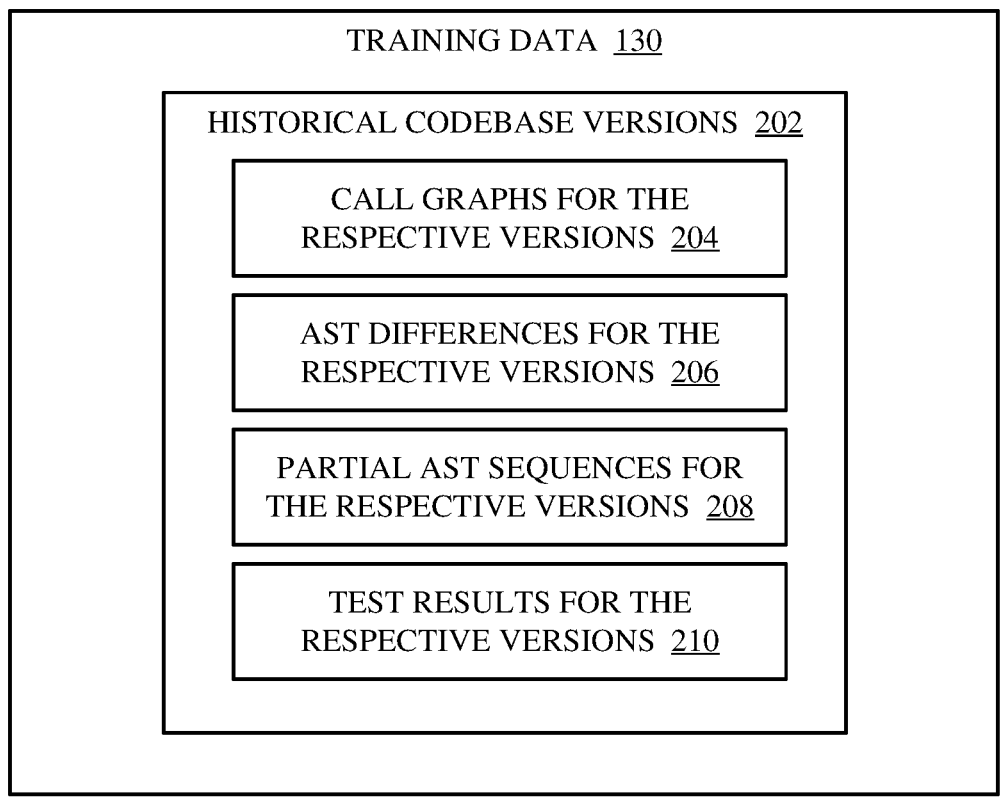
FIG. 2 illustrates a block diagram of example training data, in accordance with some embodiments of the present disclosure.

FIG. 2 illustrates a block diagram of training data 130. Training data 130 can include historical codebase data from a similar or dissimilar codebase as the modified codebase 104. In some embodiments, the training data 130 is in a different programming language than the programming language included in the modified codebase 104. In such embodiments, aspects of the present disclosure realize a transferrable machine learning model 128 insofar as the machine learning model 128 can be training on data in one programming language and implemented to generate predictions from data written in another programming language.

The training data 130 can include historical codebase versions 202. The historical codebase versions 202 can be for any codebase and need not be the same codebase as modified codebase 104, nor do historical codebase versions 202 even need to be in a same or similar programming language the modified codebase 104. The software development regression testing system 102 can use historical codebase versions 202 to generate call graphs for the respective versions 204, AST differences for the respective versions 206, partial AST sequences for the respective versions 208, and test results for the respective versions 210. In some embodiments, call graphs for the respective versions 204 are similar to the call graph 114 of FIG. 1. Similarly, in some embodiments, AST differences for the respective versions 206 are similar to the AST differences 124 of FIG. 1. Similarly, in some embodiments, partial AST sequences for the respective versions 208 are similar to the partial AST sequences 126. Accordingly, in generating training data 130, the software development regression testing system 102 can implement similar functions, techniques, and methodologies as discussed in FIG. 1 and elsewhere in the present disclosure for generating call graphs for the respective versions 204, AST differences for the respective versions 206, and partial AST sequences for the respective versions 208. Test results for the respective versions 210 comprise known test results from the historical codebase versions 202.

Figure 3:
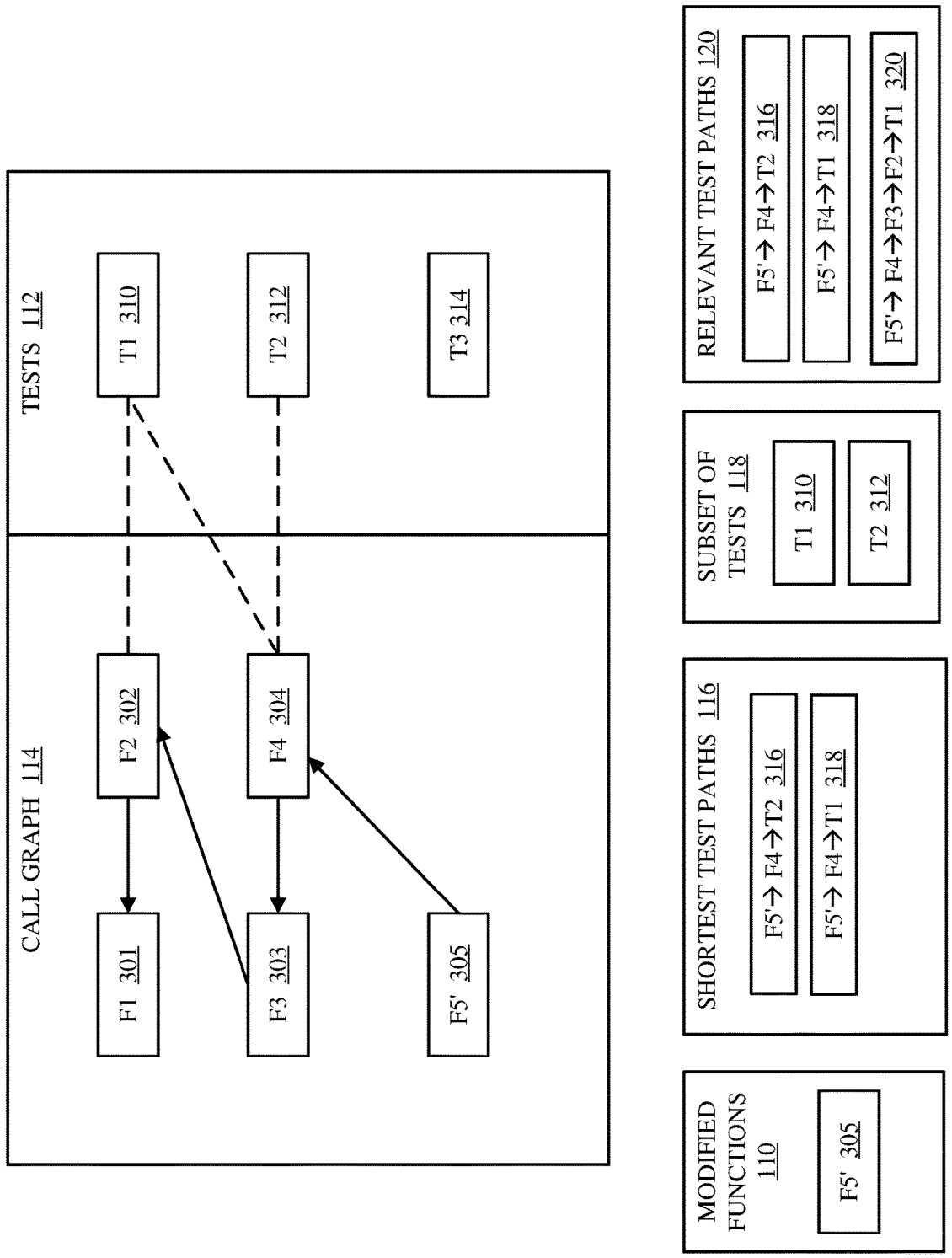
FIG. 3 illustrates a block diagram of an example call graph, tests associated with the call graph, shortest test paths connecting modified nodes to tests, a subset of tests associated with the modified nodes, and relevant test paths including at least one modified node, in accordance with some embodiments of the present disclosure.

FIG. 3 illustrates a block diagram of an example call graph 114, tests 112, modified functions 110, shortest test paths 116, subset of tests 118, and relevant test paths 120, in accordance with some embodiments of the present disclosure. As will be appreciated by one skilled in the art, FIG. 3 is shown purely for illustrative purposes, and when implementing aspects of the present disclosure against a real-world codebase, the call graph 114, tests 112, and other components illustrated in FIG. 3 can have significantly higher complexity including, for example, hundreds, thousands, or millions of nodes in the call graph 114 and tens, hundreds, or thousands of tests 112.

The call graph 114 includes five nodes include F1 301, F2 302, F3 303, F4 304, and F5' 305. Each of the aforementioned nodes can represent a function in the call graph 114. F5' 305 represents a modified function 110. Accordingly, F5' 305 is stored in modified functions 110. As can be seen, the tests 112 include T1 310, T2 312, and T3 314. The shortest test paths 116 can collect every shortest test path of any test in tests 112 that utilizes any modified function 110. In this case, since node F5' 305 is the only modified function, it can be seen that node F5' 305 is utilized in tests T1 310 and T2 312 but not test T3 314. The shortest paths associating F5' 305 (the modified function 110) to each of tests T1 310 and T2 312 is shown in the shortest test paths 116. Shortest test paths 116 can thus include a first test path F5'→F4→T2 316 and a second test path F5'→F4→T1 318.

The subset of tests 118 stores test T1 310 and test T2 312 since these tests utilize at least one node in modified functions 110. As can be seen in FIG. 3, the node F5' 305 (the modified function 110) is never utilized by test T3 314. Accordingly, test T3 314 is not included in the subset of tests 118.

The relevant test paths 120 includes every test path to each of the tests in the subset of tests 118 that also includes any of the modified functions 110. As can be seen, the relevant test paths 120 include additional test paths relative to the short test paths 116 insofar as the relevant test paths 120 include every test path utilized by each test in the subset of tests 118 and including any of the modified functions 110 rather than only the shortest test paths satisfying the aforementioned conditions. The relevant test paths 120 thus includes the first test path F5'→F4→T2 316 and the second test path F5'→F4→T1 318 as previously discussed with respect to the shortest test paths 116. Additionally, the relevant test paths 120 additionally includes a third test path F5'→F4→F3→F2→T1 320.

Figure 4:
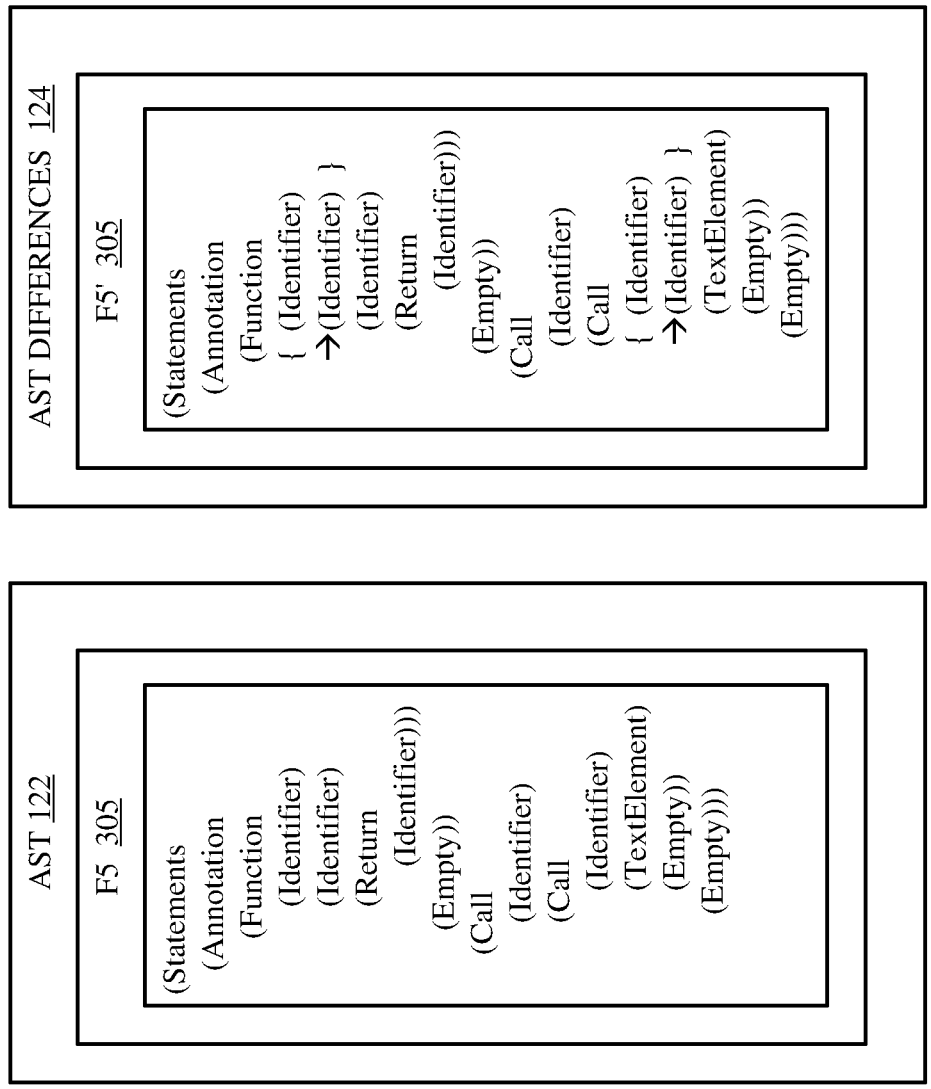
FIG. 4 illustrates a block diagram of an example Abstract Syntax Tree (AST) with s-expression notation and AST differences for modified nodes, in accordance with some embodiments of the present disclosure.

FIG. 4 illustrate a block diagram of an example AST 122 and AST differences 124. As shown, the AST 122 is for node F5 305 (i.e., the unmodified, previous, or original version of the modified function 110) and the AST differences 124 is for the node F5' 305 (i.e., the modified function 110). As shown, each of the AST 122 and AST differences 124 are presented using s-expression notation, where s-expression notation can be programming language independent. Further as shown, AST differences 124 includes arrows indicating the modified portions of node F5' 305 relative to node F5 305 (the unmodified, original, or previous version of the modified function 110).

As will be appreciated by one skilled in the art, ASTs generally and ASTs with s-expression notation specifically can be generated using a variety of techniques, methodologies, and notations. Accordingly, the specific text presented in FIG. 4 corresponding to the ASTs is purely for exemplary purposes and should not be construed as limiting. Alternative formats, syntax, statements, groupings, and/or other editorial differences that may be realized for different versions of ASTs and/or ASTs with s-expression notation are within the spirit and scope of the present disclosure.

Figure 5:
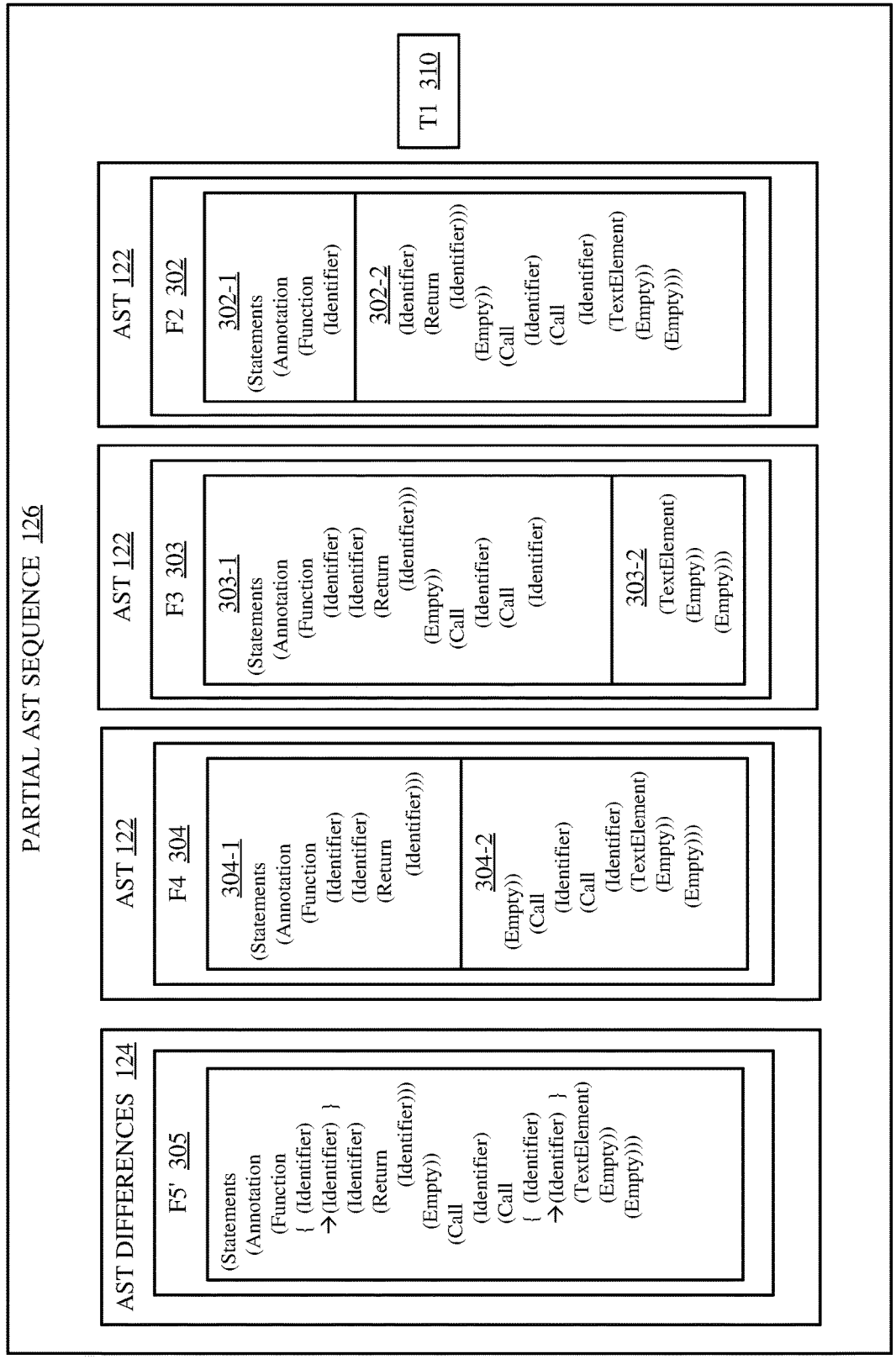
FIG. 5 illustrates a block diagram of an example partial AST sequence, in accordance with some embodiments of the present disclosure.

FIG. 5 illustrates a block diagram of an example partial AST sequence 126, in accordance with some embodiments of the present disclosure. The partial AST sequence 126 illustrated in FIG. 5 corresponds to the third path F5'→F4→F3→F2→T1 320 discussed with respect to the relevant test paths 120 in FIG. 3. Thus, aspects of the present disclosure can generate a partial AST sequence 126 for each of the test paths in relevant test paths 120. However, for simplicity, FIG. 5 illustrates only the partial AST sequence 126 corresponding to the third path F5'→F4→F3→F2→T1 320.

Consistent with the sequence of the third path F5'→F4→F3→F2→T1 320, the corresponding partial AST sequence 126 includes the AST differences 124 for node F5' 305 (the modified function 110). A relevant portion of the AST 122 of the node F4 304, a relevant portion of the AST 122 of the node F3 303, a relevant portion of the AST 122 of the node F2 302, and an indicator of the test T1 310.

The relevant portions of each of the nodes occurring after the modified function 110 (node F5' 305) in the third path F5'→F4→F3→F2→T1 320 are selected as the portion of the subject node that executes after calling the previous node. Accordingly, the AST 122 of node F4 304 can be separated into a first portion 304-1 and a second portion 304-2. The second portion 304-2 can correspond to the portion of node F4 304 that is executed after calling node F5' 305. Similarly, the AST 122 of node F3 303 can be separated into a first portion 303-1 and a second portion 303-2. The second portion 303-2 can correspond to the portion of node F3 303 that is executed after calling node F4 304. Similarly, the AST 122 for node F2 302 can include a first portion 302-1 and a second portion 302-2. The second portion 302-2 can correspond to the portion of node F2 302 that is executed after calling node F3 303. In this way, the partial AST sequence 126 can capture the cascaded effect of a modified function 110 through a test path of the relevant test paths 120.

Figure 6:
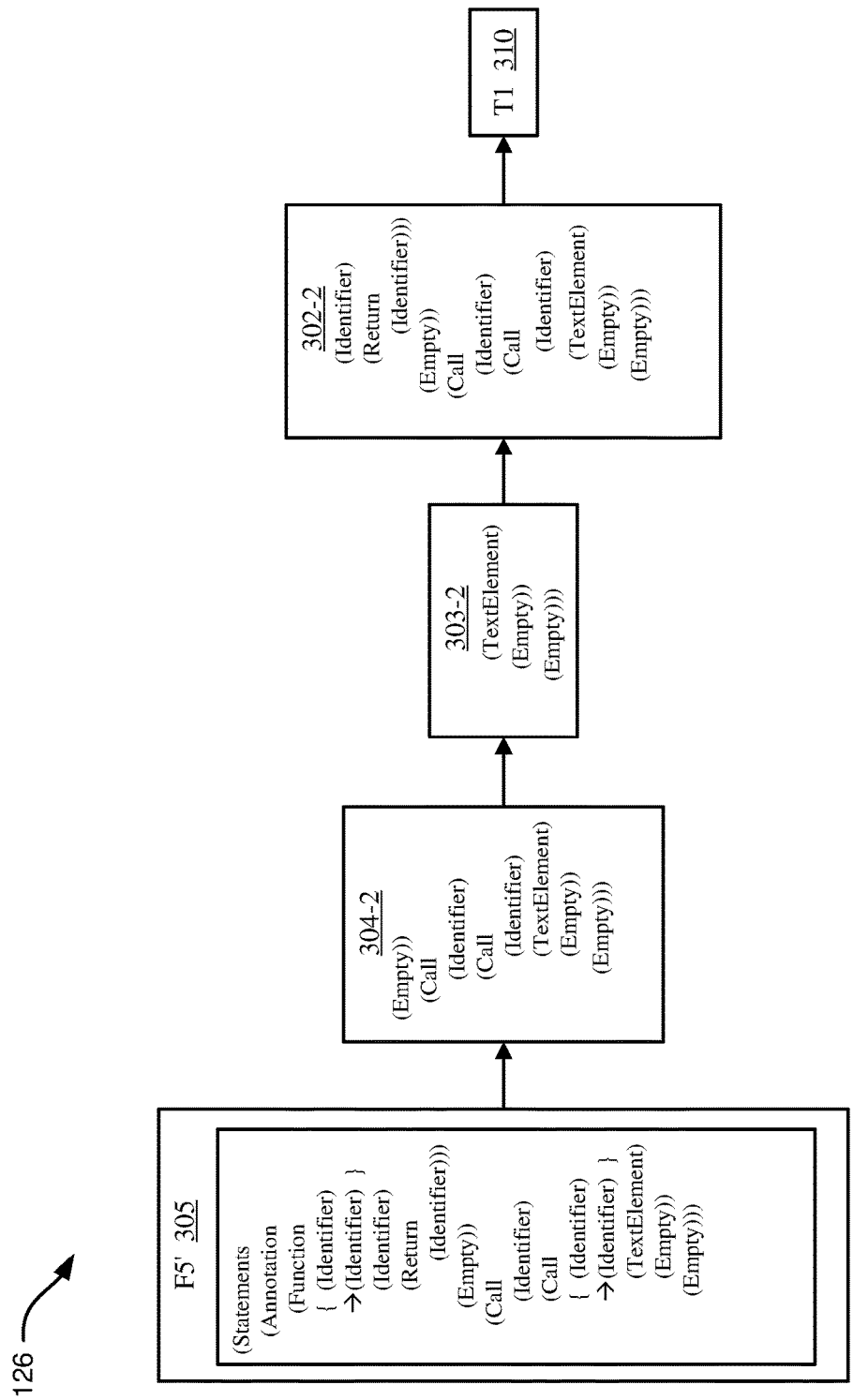
FIG. 6 illustrates a block diagram of another example partial AST sequence, in accordance with some embodiments of the present disclosure.

Referring now to FIG. 6, illustrated is a simplified view of the partial AST sequence 126 corresponding to the third path F5'→F4→F3→F2→T1 320. The partial AST sequence 126 includes the AST differences 124 for node F5' 305, the AST 122 for the second portion 304-2 of node F4 304, the second portion 303-2 of node F3 303, the second portion 302-2 of node F2 302, and an indication of test T1 310.

As can be seen in FIG. 6, the partial AST sequence 126 is an efficient, programming-language independent data structure that succinctly captures the cascaded effects of a modified function 110 (e.g., node F5' 305) through one of the relevant test paths 120 (e.g., the third path F5'→F4→F3→F2→T1 320). In some embodiments, the partial AST sequence 126 can be defined as a union of all partial ASTs called by nodes in a given test path of the relevant test paths 120.

Figure 7:
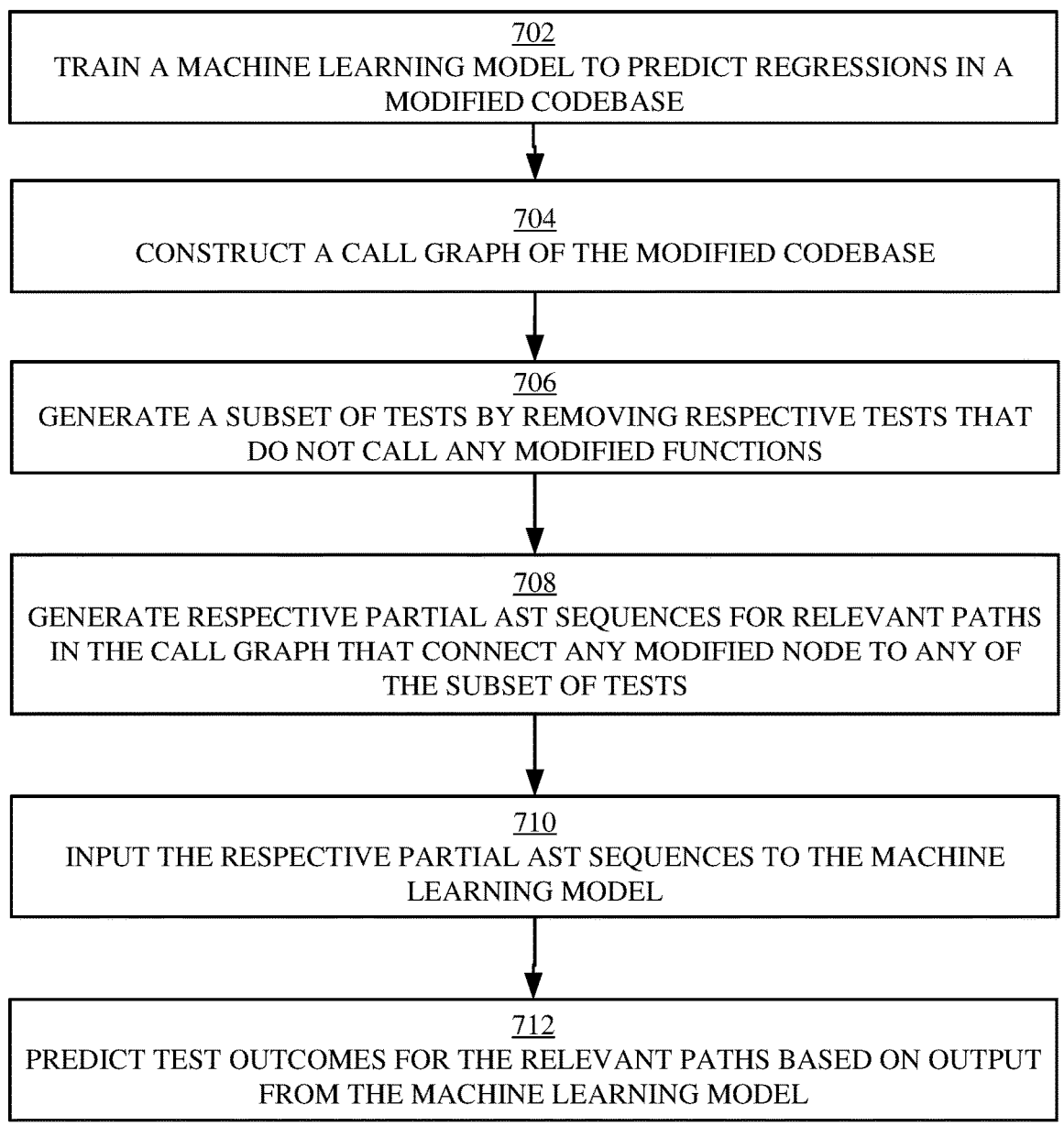
FIG. 7 illustrates a flowchart of an example method for predictive regression testing, in accordance with some embodiments of the present disclosure.

FIG. 7 illustrates a flowchart of an example method 700 for generating predicted regression testing results 132, in accordance with some embodiments of the present disclosure. The method 700 can be implemented by, for example, a software development regression testing system 102, a processor, a computer, or another combination of hardware and/or software.

Operation 702 includes training a machine learning model 128 to generate predicted regression testing results 132 in a modified codebase 104. Training the machine learning model 128 can include curating training data 130 and subsequently training the machine learning model 128 using the training data 130. As previously discussed, the training data 130 can include historical codebase versions 202 of a similar or dissimilar codebase as the modified codebase 104. The historical codebase versions 202 can include, for example, call graphs for the respective versions 204, AST differences for the respective versions 206, partial AST sequences for the respective versions 208, and test results for the respective versions 210.

Operation 704 includes constructing a call graph 114 of the modified codebase 104. The call graph 114 can be any call multigraph, control flow graph, or other graph indicative of calling routines between subroutines in the modified codebase 104 where respective nodes can represent respective functions (or procedures) and where respective edges can indicate calling relationships between the respective functions.

Operation 706 includes generating a subset of tests 118 by removing respective tests 112 that do not call any modified functions 110. Advantageously, determining the subset of tests 118 improves processing efficiency by only implementing those tests 112 which may be influenced by the modified functions 110.

Operation 708 includes generating respective partial AST sequences 126 for paths in the relevant test paths 120. Operation 708 is discussed in more detail hereinafter with respect to FIG. 8.

Operation 710 includes inputting the respective partial AST sequences 126 to the machine learning model 128. Operation 712 includes generating predicted regression testing results 132 for each of the relevant test paths 120 based on outputs from the machine learning model 128.

Figure 8:
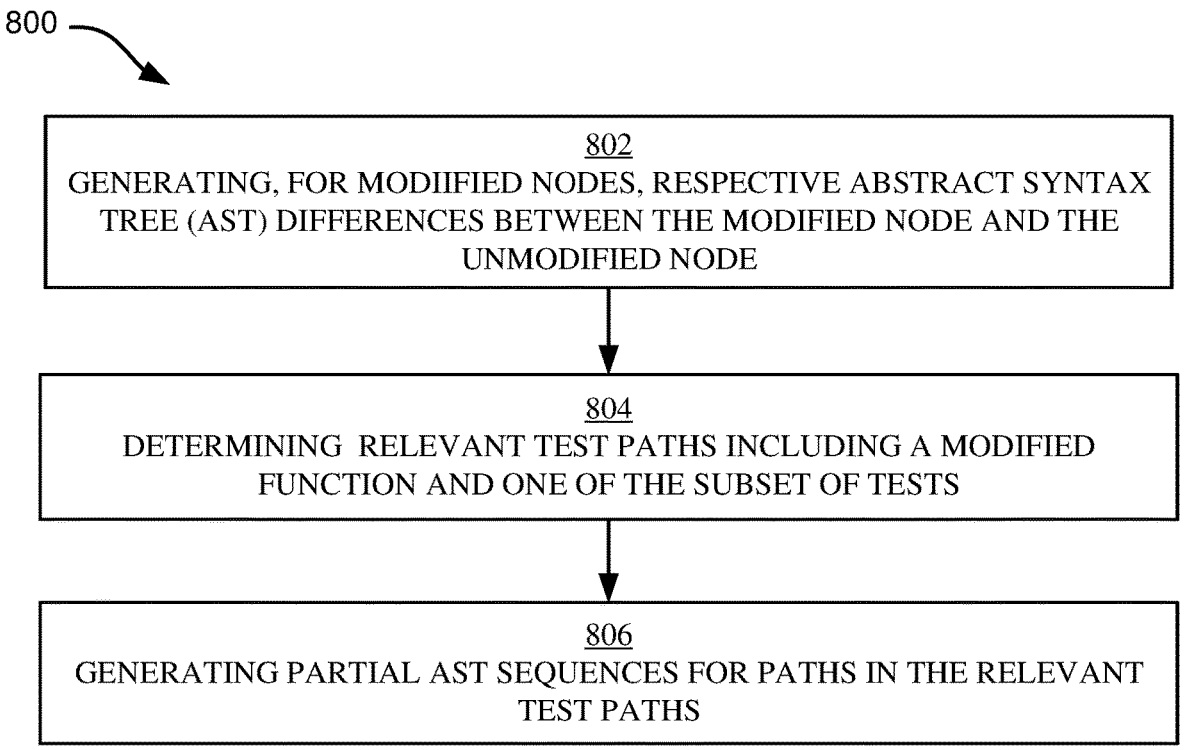
FIG. 8 illustrates a flowchart of an example method for generating partial AST sequences, in accordance with some embodiments of the present disclosure.

FIG. 8 illustrates a flowchart of an example method 800 for generating partial AST sequences 126, in accordance with some embodiments of the present disclosure. The method 800 can be implemented by, for example, a software development regression testing system 102, a processor, a computer, or another combination of hardware and/or software. In some embodiments, the method 800 is a sub-method of operation 708 of FIG. 7.

Operation 802 includes generating, for nodes of modified functions 110, respective AST differences 124 between the modified node and a previous (e.g., original, historical, validated, etc.) version of the same node.

Operation 804 includes determining relevant test paths 120, where the relevant test paths 120 include all test paths including at least one node of a modified function 110 and at least one test of the subset of tests 118. In other words, the relevant test paths 120 include all test paths that could be influenced by any modified function 110.

Operation 806 includes generating a partial AST sequence 126 for paths in the relevant test paths 120. As previously discussed, the partial AST sequence 126 can include, for a first path, a first AST 122 or 124 (depending on whether the first node in the path is modified or not), and for each subsequent node in the first path, the portion of the AST of the subsequent node that executes after calling the previous node in the first path.

Figure 9:
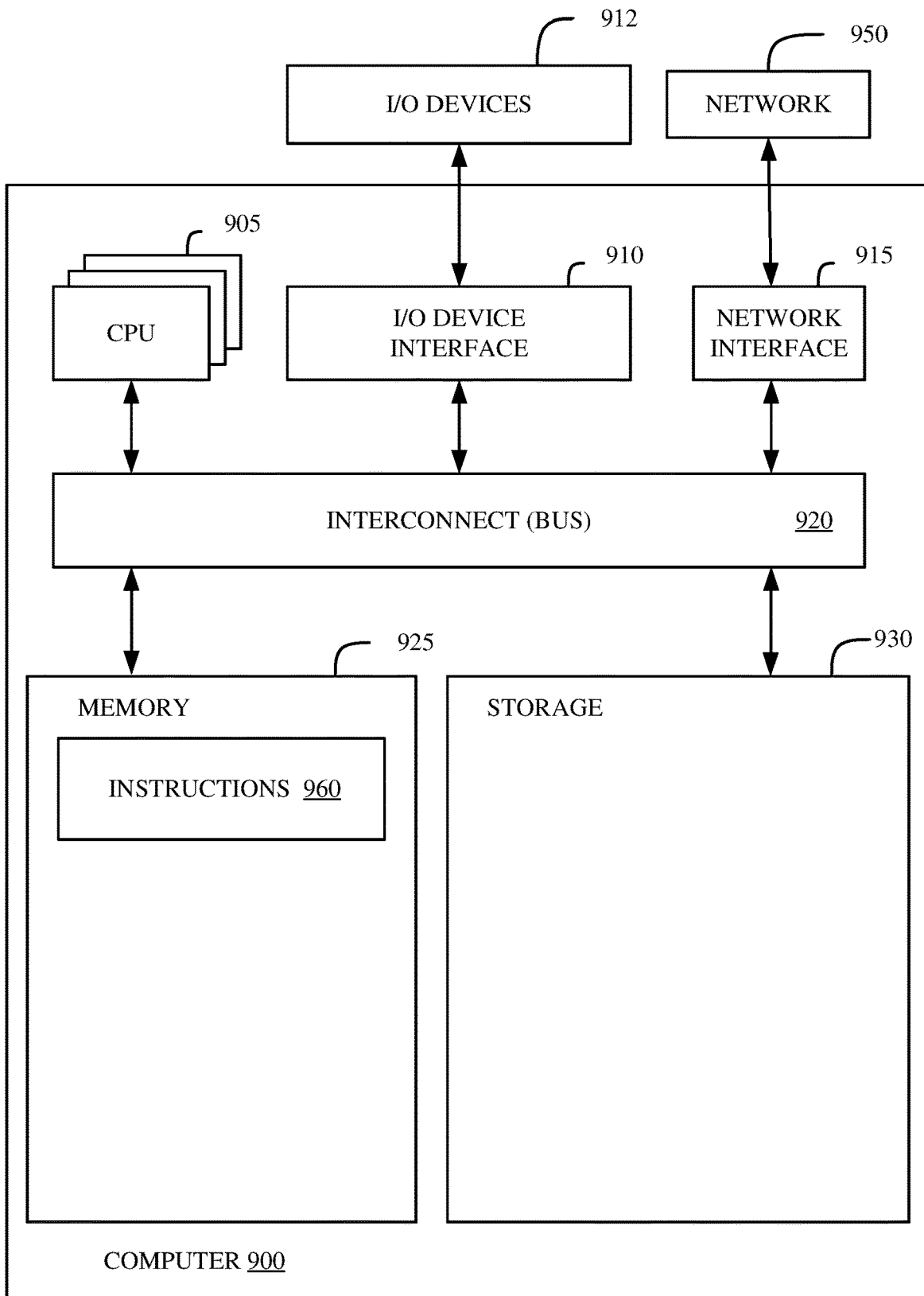
FIG. 9 illustrates a block diagram of an example computer, in accordance with some embodiments of the present disclosure.

FIG. 9 illustrates a block diagram of an example computer 900 in accordance with some embodiments of the present disclosure. In various embodiments, computer 900 can perform any or all of the method described in FIGS. 7-8 and/or implement the functionality discussed in any one of FIGS. 1-6. In some embodiments, computer 900 receives instructions related to the aforementioned methods and functionalities by downloading processor-executable instructions from a remote data processing system via network 950. In other embodiments, computer 900 provides instructions for the aforementioned methods and/or functionalities to a client machine such that the client machine executes the method, or a portion of the method, based on the instructions provided by computer 900. In some embodiments, the computer 900 is incorporated into (or functionality similar to computer 900 is virtually provisioned to) the software development regression testing system 102 of FIG. 1 or another aspect of the present disclosure.

Computer 900 includes memory 925, storage 930, interconnect 920 (e.g., BUS), one or more CPUs 905 (also referred to as processors herein), I/O device interface 910, I/O devices 912, and network interface 915.

Each CPU 905 retrieves and executes programming instructions stored in memory 925 or storage 930. Interconnect 920 is used to move data, such as programming instructions, between the CPUs 905, I/O device interface 910, storage 930, network interface 915, and memory 925. Interconnect 920 can be implemented using one or more busses. CPUs 905 can be a single CPU, multiple CPUs, or a single CPU having multiple processing cores in various embodiments. In some embodiments, CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of a random-access memory (e.g., static random-access memory (SRAM), dynamic random access memory (DRAM), or Flash). Storage 930 is generally included to be representative of a non-volatile memory, such as a hard disk drive, solid state device (SSD), removable memory cards, optical storage, or flash memory devices. In an alternative embodiment, storage 930 can be replaced by storage area-network (SAN) devices, the cloud, or other devices connected to computer 900 via I/O device interface 910 or network 950 via network interface 915.

In some embodiments, memory 925 stores instructions 960. However, in various embodiments, instructions 960 are stored partially in memory 925 and partially in storage 930, or they are stored entirely in memory 925 or entirely in storage 930, or they are accessed over network 950 via network interface 915.

Instructions 960 can be computer-readable and computer-executable instructions for performing any portion of, or all of, the methods of FIGS. 7-8 and/or implement the functionality discussed in FIGS. 1-6. In some embodiments, instructions 960 can be referred to as a predictive regression testing protocol, predictive regression testing instructions, and/or a predictive regression testing mechanism. Although instructions 960 are shown in memory 925, instructions 960 can include program instructions collectively stored across numerous computer-readable storage media and executable by one or more CPUs 905.

In various embodiments, I/O devices 912 include an interface capable of presenting information and receiving input. For example, I/O devices 912 can present information to a user interacting with computer 900 and receive input from the user.

Computer 900 is connected to network 950 via network interface 915. Network 950 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
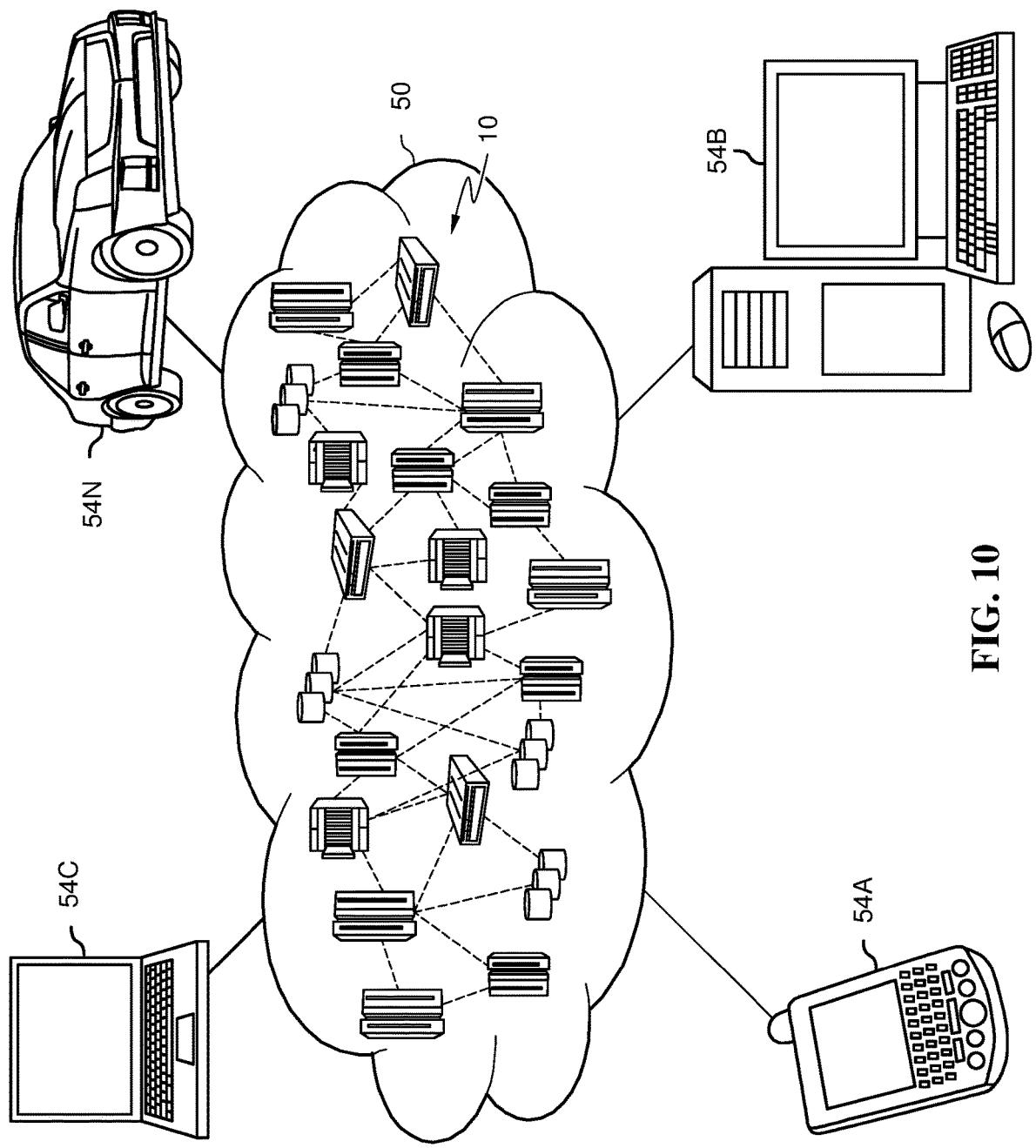
FIG. 10 depicts a cloud computing environment, in accordance with some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
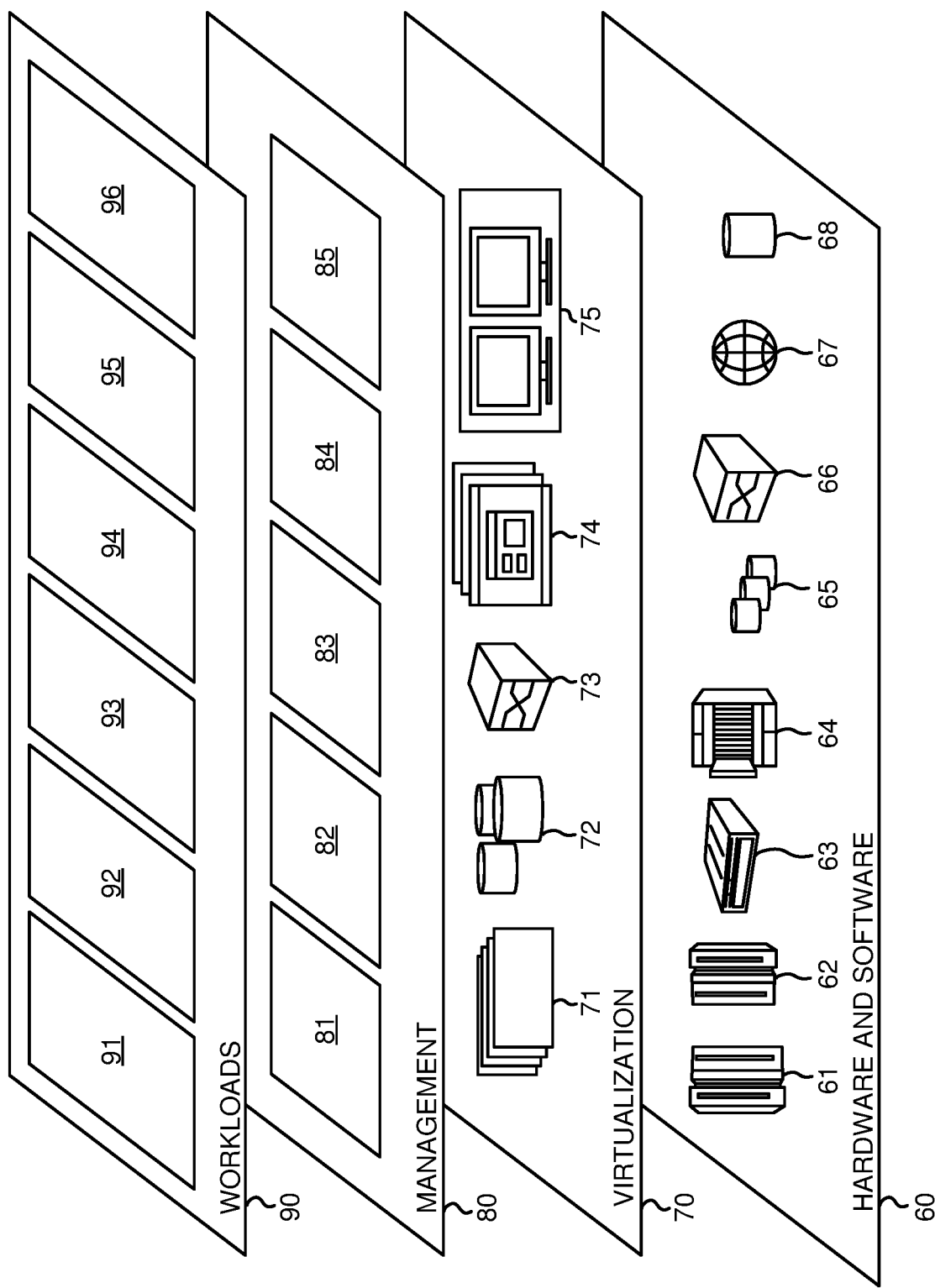
FIG. 11 depicts abstraction model layers, in accordance with some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive regression testing 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9 and/or any software configured to perform any portion of the method described with respect to FIGS. 7-8 and/or implement any portion of the functionality discussed in FIGS. 1-6) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of some example aspects of the present disclosure will now be described.

Example 1: A computer-implemented method comprising: constructing a call graph of a modified codebase including at least one modified node corresponding to a modified function; generating a subset of codebase tests by removing respective codebase tests that do not call for the at least one modified node; generating respective partial Abstract Syntax Trees (AST) sequences for relevant test paths in the call graph that connect the at least one modified node to one of the subset of codebase tests; inputting, to a machine learning model, the respective partial AST sequences; and generating, based on output from the machine learning model, predicted regression testing results for the relevant test paths.

Example 2: The method of Example 1, wherein a first partial AST sequence of the partial AST sequences comprises at least a portion of respective ASTs of each node in a first test path of the relevant test paths.

Example 3: The method of Example 2, wherein the portion of the respective ASTs of each node is a segment of the respective AST that is executed after calling a previous node in the first test path of the relevant test paths.

Example 4: The method of Examples 2 or 3, wherein the first partial AST sequence comprises a union of all partial ASTs called by nodes in the first test path.

Example 5: The method of any of Examples 2-4, wherein the first partial AST includes an indication of differences between the at least one modified node relative to a previous version of the at least one modified node.

Example 6: The method of any of Examples 1-5, wherein respective ASTs of the respective partial AST sequences are ASTs with an s-expression notation.

Example 7: The method of Example 6, wherein the respective ASTs with the s-expression notation are programming language independent.

Example 8: The method of any of Examples 1-7, wherein the machine learning model is transferrable between different programming languages.

Example 9: The method of any of Examples 1-8, wherein the method further comprises: training the machine learning model for generating predicted regression testing results in the modified codebase, wherein the machine learning model receives, as training data, a plurality of versions of a codebase with corresponding test results associated with each version.

Example 10: The method of Example 9, wherein, for a first version of the codebase, the training data comprises: a first call graph corresponding to the first version of the codebase; AST differences for each modified node in the first call graph; and partial AST sequences for relevant test paths connecting each modified node in the first call graph to a test result in the first version of the codebase.

Example 11: The method of any of Examples 1-10, wherein the call graph comprises a set of nodes corresponding to a set of functions of the modified codebase, and wherein edges interconnecting the set of nodes represent calls between functions in the modified codebase.

Example 12: The method of any of examples 1-11, wherein the method is performed by a software development regression testing system according to software that is downloaded to the software development regression testing system from a remote data processing system.

Example 13: The method of Example 12, wherein the method further comprises: metering a usage of the software; and generating an invoice based on metering the usage.

Example 14: A system comprising: one or more processors; and one or more computer-readable storage media storing program instructions which, when executed by the one or more processors, are configured to cause the one or more processors to perform the method of any of Examples 1-13.

Example 15: A computer program product comprising one or more computer readable storage media, and program instructions collectively stored on the one or more computer readable storage media, the program instructions comprising instructions configured to cause one or more processors to perform the method of any of Examples 1-13.

What is claimed is:

1. A computer-implemented method comprising:
   constructing a call graph of a modified codebase including at least one modified node corresponding to a modified function;
   generating a subset of codebase tests by removing respective codebase tests that do not call for the at least one modified node;
   generating respective partial Abstract Syntax Trees (AST) sequences for relevant test paths in the call graph that connect the at least one modified node to one of the subset of codebase tests;
   executing a machine learning model to generate predicted regression testing results for the relevant test paths using the respective partial AST sequences as input, wherein the machine learning model is trained using training data comprising:
      a first call graph corresponding to a first version of a codebase;
      AST differences for each modified node in the first call graph; and
      partial AST sequences for the relevant test paths connecting each modified node in the first call graph to a test result in the first version of the codebase; and
   generating, based on output from the machine learning model, the predicted regression testing results for the relevant test paths.

2. The method of claim 1, wherein a first partial AST sequence of the partial AST sequences comprises at least a portion of respective ASTs of each node in a first test path of the relevant test paths.

3. The method of claim 2, wherein the portion of the respective ASTs of each node is a segment of the respective AST that is executed after calling a previous node in the first test path of the relevant test paths.

4. The method of claim 2, wherein the first partial AST sequence comprises a union of all partial ASTs called by nodes in the first test path.

5. The method of claim 2, wherein the first partial AST includes an indication of differences between the at least one modified node relative to a previous version of the at least one modified node.

6. The method of claim 1, wherein respective ASTs of the respective partial AST sequences are ASTs with an s-expression notation.

7. The method of claim 6, wherein the respective ASTs with the s-expression notation are programming language independent.

8. The method of claim 1, wherein the machine learning model is transferrable between different programming languages.

9. The method of claim 1, further comprises:
   training the machine learning model for generating predicted regression testing results in the modified codebase, wherein the machine learning model receives, as the training data, a plurality of versions of a codebase with corresponding test results associated with each version.

10. The method of claim 1, wherein the call graph comprises a set of nodes corresponding to a set of functions of the modified codebase, and wherein edges interconnecting the set of nodes represent calls between functions in the modified codebase.

11. The method of claim 1, wherein the method is performed by a software development regression testing system according to software that is downloaded to the software development regression testing system from a remote data processing system.

12. The method of claim 11, wherein the method further comprises:
   metering a usage of the software; and
   generating an invoice based on metering the usage.

13. A system comprising:
   one or more processors; and
   one or more computer-readable storage media storing program instructions which, when executed by the one or more processors, cause the one or more processors to perform a method comprising:
   constructing a call graph of a modified codebase including at least one modified node corresponding to a modified function;
   generating a subset of codebase tests by removing respective codebase tests that do not call for the at least one modified node;
   generating respective partial Abstract Syntax Trees (AST) sequences for relevant test paths in the call graph that connect the at least one modified node to one of the subset of codebase tests;
   executing a machine learning model to generate predicted regression testing results for the relevant test paths using the respective partial AST sequences as input, wherein the machine learning model is trained using training data comprising:
      a first call graph corresponding to a first version of a codebase;
      AST differences for each modified node in the first call graph; and
      partial AST sequences for the relevant test paths connecting each modified node in the first call graph to a test result in the first version of the codebase; and generating, based on output from the machine learning model, the predicted regression testing results for the relevant test paths.

14. The system of claim 13, wherein a first partial AST sequence of the partial AST sequences comprises at least a portion of respective ASTs of each node in a first test path of the relevant test paths, and wherein the portion of the respective ASTs of each node is a segment of the respective AST that is executed after calling a previous node in the first test path of the relevant test paths.

15. The system of claim 13, wherein respective ASTs of the respective partial AST sequences are ASTs with an s-expression notation.

16. The system of claim 13, the method further comprising:
training the machine learning model for generating the predicted regression testing results in the modified codebase, wherein the machine learning model receives, as the training data, a plurality of versions of a codebase with corresponding test results associated with each version.

17. A computer program product comprising one or more computer readable storage media, and program instructions collectively stored on the one or more computer readable storage media, the program instructions comprising instructions to cause one or more processors to perform a method comprising:
constructing a call graph of a modified codebase including at least one modified node corresponding to a modified function;
generating a subset of codebase tests by removing respective codebase tests that do not call for the at least one modified node;
generating respective partial Abstract Syntax Trees (AST) sequences for relevant test paths in the call graph that connect the at least one modified node to one of the subset of codebase tests;
executing a machine learning model to generate predicted regression testing results for the relevant test paths using the respective partial AST sequences as input, wherein the machine learning model is trained using training data comprising:
a first call graph corresponding to a first version of a codebase;
AST differences for each modified node in the first call graph; and
partial AST sequences for the relevant test paths connecting each modified node in the first call graph to a test result in the first version of the codebase; and
generating, based on output from the machine learning model, predicted regression testing results for the relevant test paths.

18. The computer program product of claim 17, wherein respective ASTs of the respective partial AST sequences are ASTs with an s-expression notation.

19. The computer program product of claim 18, wherein the machine learning model is transferrable between different programming languages.

20. The computer program product of claim 17, the method further comprising:
training the machine learning model for generating the predicted regression testing results in the modified codebase, wherein the machine learning model receives, as the training data, a plurality of versions of a codebase with corresponding test results associated with each version.

* * * * *